United States Patent [19]
Neeb et al.

[11] 4,118,317
[45] Oct. 3, 1978

[54] METHOD OF PURIFYING ION EXCHANGER RESINS SPENT IN THE OPERATION OF A NUCLEAR REACTOR

[75] Inventors: Karl-Heinz Neeb, Erlangen; Heinrich Richter, Fürth, both of Germany

[73] Assignee: Kraftwerk Union Aktiengesellschaft, Mühlheim (Ruhr), Germany

[21] Appl. No.: 770,289

[22] Filed: Feb. 22, 1977

[30] Foreign Application Priority Data

Feb. 23, 1976 [DE] Fed. Rep. of Germany ....... 2607292

[51] Int. Cl.² ............................................. B01D 15/06
[52] U.S. Cl. ........................................ 210/32; 210/34; 210/38 C; 176/37
[58] Field of Search .................... 210/24, 32, 34, 27, 210/38 C, 31 R; 176/37; 252/301.1 W; 423/6, 7

[56] References Cited

U.S. PATENT DOCUMENTS

| | | | |
|---|---|---|---|
| 3,453,214 | 7/1969 | Bonnin et al. | 423/7 |
| 3,896,045 | 7/1975 | Peeters et al. | 423/6 |
| 3,922,231 | 11/1975 | Carlin et al. | 423/6 |
| 3,962,078 | 6/1976 | Hirs | 210/34 |
| 4,024,911 | 5/1977 | Forrest et al. | 176/37 |

FOREIGN PATENT DOCUMENTS

| | | | |
|---|---|---|---|
| 1,485,541 | 1/1966 | France | 210/38 C |
| 2,035,925 | 1/1972 | Fed. Rep. of Germany | 176/37 |

Primary Examiner—Charles N. Hart
Assistant Examiner—Benoit Castel
Attorney, Agent, or Firm—Herbert L. Lerner

[57] ABSTRACT

Method of freeing from radioactive corrosion products and from conditioning substances stemming from the coolant loop of a nuclear reactor, ion exchanger resins spent in the operation of the reactor includes thoroughly rinsing the resin with deionate so as to release suspended radioactive substances from the resins, separating the release suspended radioactive substances in a mechanical filter, rinsing with diluted mineral acid the resin previously rinsed with deionate so as to release radioactive cations and anions therefrom, adsorbing the cations and anions in an adsorber substance fixed on an inorganic carrier, and separating the conditioning substances from the mineral acid with which the resins have been rinsed and forming chemical compounds therewith for reuse.

7 Claims, 1 Drawing Figure

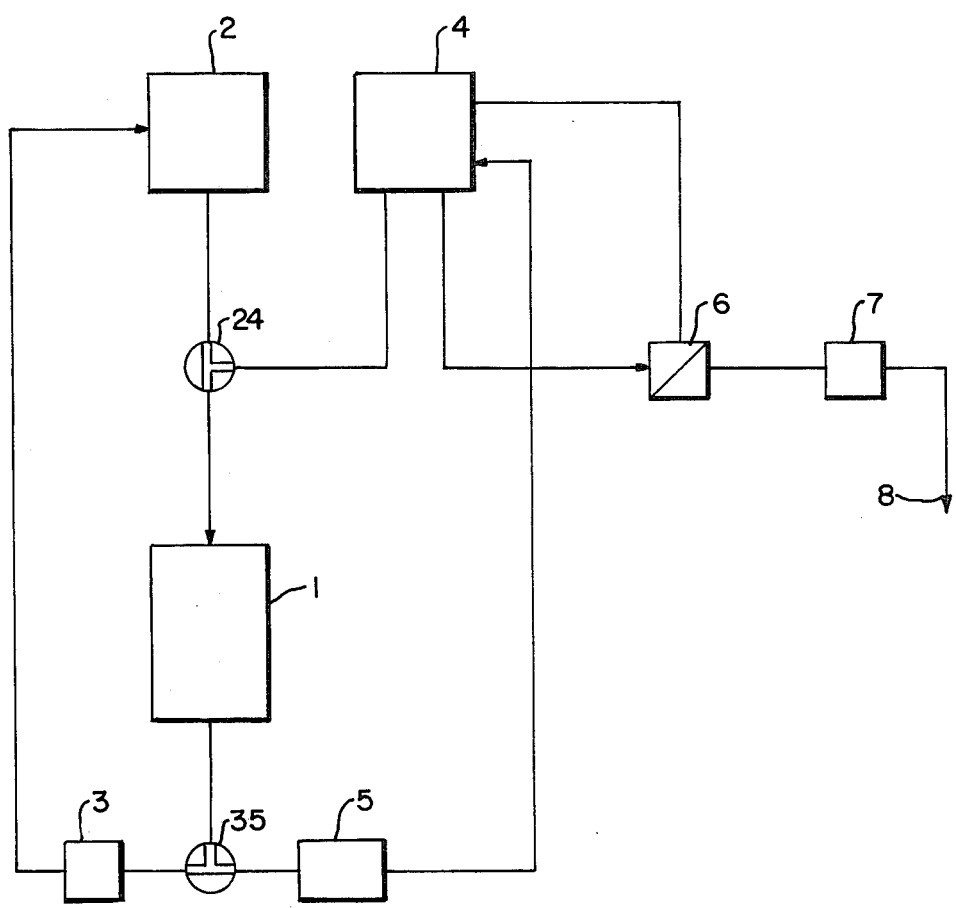

METHOD OF PURIFYING ION EXCHANGER RESINS SPENT IN THE OPERATION OF A NUCLEAR REACTOR

The invention relates to a method of purifying ion exchanger resins that have been spent in the operation of a nuclear reactor, from radioactive corrosion products and conditioning material coming from the coolant loop. Such ion exchanger resins are of the mixed-bed type and come from the coolant purification system, for example, of water-cooled power reactors and, in the course of time during which they are applied, they are laden with considerable active quantities of radioactive fission and corrosion products. It was customary, heretofore, to assign these resins, after they were spent, to the radioactive wastes. The rapidly increasing number of nuclear power plants causes an extraordinary increase in the quantity of these spent ion exchanger resins, the removal of which as medium-active waste brings with it not only financial problems but, for safety reasons, also special technical measures in connection with the solidification for ultimate storage.

The conditioning substances that are contained in the coolant, particularly in the case of pressurized-water reactors, such as the alkalizing agent lithium 7, for example, also appear to be too valuable to be discarded with heavy financial loss, with the increasing number of nuclear power plants.

The problem therefore arises of freeing the spent ion exchanger resins of their laden activity and also, of recovering the conditioning substances from the coolant loop.

It is accordingly an object of the invention to provide a method of purifying ion exchanger resins spent in the operation of a nuclear reactor which frees them from their activity loading and which also affords the recovery from the reactor coolant loop of conditioning substances contained therein.

With the foregoing and other objects in view, there is provided, in accordance with the invention, a method of freeing from radioactive corrosion products and from conditioning substances stemming from the coolant loop of a nuclear reactor, ion exchanger resins spent in the separation of the reactor which comprises thoroughly rinsing the resin with deionate so as to release suspended radioactive substances from the resins, separating the releases suspended radioactive substances in a mechanical filter, rinsing with diluted mineral acid the resin previously rinsed with deionate so as to release radioactive cations and anions therefrom, adsorbing the cations and anions in an adsorber substance fixed on an inorganic carrier, and separting the conditioning substances from the mineral acid with which the resins have been rinsed and forming chemical compounds therewith for reuse.

In accordance with other modes of the method invention, the mechanical filter is formed of inorganic filter material, the adsorber substance which react with the nuclides is selected from the group consisting of ferroferricyanides and Ag compounds, the conditioning substances comprise boron and lithium, the mineral acid is nitric acid, and the chemical compounds formed are compounds thereof.

In accordance with a further mode of the method invention, the rinsing steps are effected with a rinsing agent circulating in the coolant loop of the reactor.

In accordance with a concomitant mode of the method invention, the separated lithium is formed into a compound of LiOH for reuse in the foregoing method.

The corrosion products removed from the coolant loop of a nuclear reactor by the coolant purification system of the reactor are present mainly in the form of suspended particles, which are retained by the resin particles mechanically or by means of surface forces or tension. Among other substances, these corrosion products contain the radionuclides cobalt 60, cobalt 58, and manganese 54; in addition to these gamma-radiating radionuclides, additional long-lived nuclides, such as the pure betaemitters nickel 63 and iron 55, for example, are also present. Also present on the spent ion exchanger are fission products in amounts that differ in accordance with the condition of the fuel element and which are very extensively bound to the reactive groups of the resin (e.g. cesium 137, cesium 134 and iodine 129). This brief list of radioactive nuclides present on spent ion exchangers makes no claim for completeness, of course, but rather provides, on the other hand, an indication as to the high radioactivity of spent ion exchanger resins, if the latter are to be treated simply as waste.

The method of the instant application now provides the possibility of releasing or detaching these radioactive corrosion products from ion exchanger resins to a great extent and to concentrate them on special filters, which must, of course, likewise be treated as radioactive waste but which, however, require considerably less space.

Other features which are considered as characteristic for the invention are set forth in the appended claims.

Although the invention is illustrated and described herein as embodied in a method of purifying ion exchanger resins spent in the operation of a nuclear reactor, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying single FIGURE of the drawing which constitutes a schematic circuit diagram or flow chart of the method of the invention.

Referring now to the drawing in order to explain the method invention of the instant application, it is noted that spent ion exchanger resin is received in a waste tank 1 and, in accordance with the initial step of the method, is rinsed with deionate or demineralized water (salt-free water) from a supply tank 2. For this purpose, the deionate is supplied to the tank 1 through a three-way valve 24, and is subsequently returned through a three-way valve 35 and a filter 3 to the supply tank 2. Compounds mainly containing radioactive cobalt, such as oxides, for example, which have been released or dislodged from the resin, are preferably separated or deposited on inorganic filter material in the filter 3.

This operation serves to prevent any possibly troublesome loading or charging of the filter 5 with undissolved oxide particles in the second step of the method.

For the second step of the method, the three-way valves 24 and 35 are adjusted or switched over so that diluted mineral acid e.g. nitric acid, is conducted in a closed loop from supply tank 4 thereof through the resin waste tank 1 and a filter 5. The compounds released or detached by the diluted acid and which contain cesium and cobalt isotopes, for example, are selectively bound to an adsorber substance provided in the filter 5 and consisting essentially of mixed ferro-ferricyanides or Ag compounds, for example.

After the latter step of the method is completed, this instant of time being determined after a minimum of radioactive radiation from the circulated, diluted mineral acid is attained, the mineral acid is circulated through a separator 6, wherein conditioning substances, which are present therein, such as boron and lithium, for example, are separated or deposited by conventional techniques. These separated conditioning substances are then converted in a treatment device 7 into such chemical form as, for example, LiOH, so that they can be returned to the coolant loop 8 of the nuclear reactor plant for reuse.

The method invention of the instant application thus makes possible a simplification of waste disposal of the spent ion exchanger resins; a concentration of the radioactive corrosion products from the coolant loop of the nuclear reactor into a narrow space and thereby preparation thereof for ultimate storage; and recovery in addition, of the valuable conditioning substances for the reactor coolant. A slight amount of radioactivity that may yet accompany these recovered substances, offers no interference, from a practical standpoint, since the extent thereof is certainly less that that of the coolant loop during operation.

There are claimed:

1. In a method of treating liquid coolant from a coolant loop of a nuclear reactor and containing radioactive fission and corrosion products and chemical substances for conditioning the coolant by pasing said liquid coolant in contact with mixed-bed ion exchanger resins to remove radioactive fission and corrosion products which are radionuclides mechanically and chemically bound as radioactive cations and anions to the ion exchanger resins, the ion exchanger resins also removing conditioning substances, the combination therewith comprising the sequential steps of freeing from radioactive fission and corrosion products and from conditioning substances the ion exchanger resins spent in the operation of removal of said products and said substances by thoroughly rinsing the resin with demineralized water so as to release said mechanically bound suspended radioactive substances from the resins, separating the released suspended radioactive substances contained in the demineralized water in a mechanical filter, rinsing with diluted mineral water in a mechanical filter, rinsing with diluted mineral acid the resin previously rinsed with demineralized water so as to release radioactive cations and anions therefrom and produce a mineral acid containing radionuclides of said radioactive cations and anions together with the conditioning substances, selectively adsorbing radionuclides of the cations and anions in an adsorber substance which is a reactant for the radionuclides fixed on an inorganic carrier, separating the conditioning substances from the mineral acid with which the resins have been rinsed and coverting the separated conditioning substances into a form of chemical compounds used in said liquid coolant for reuse in liquid coolant.

2. Method according to claim 1 wherein the mechanical filter is formed of inorganic filter material.

3. Method according to claim 1 wherein the adsorber substance is selected from the group consisting of ferro-ferricyanides and Ag compounds.

4. Method according to claim 1 wherein the conditioning substances comprise boron and lithium, and the chemical compounds formed are compounds thereof.

5. Method according to claim 4 wherein the separated lithium is formed into a compound of LiOH for reuse.

6. Method according to claim 1 wherein the rinsing steps are effected with a rinsing agent circulating in the coolant loop of the reactor.

7. Method according to claim 1 wherein the mineral acid is nitric acid.

* * * * *